US008219538B2

(12) United States Patent
Tago

(10) Patent No.: US 8,219,538 B2
(45) Date of Patent: Jul. 10, 2012

(54) SEARCH DEVICE AND SEARCH METHOD

(75) Inventor: Shinichiro Tago, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 267 days.

(21) Appl. No.: 12/759,882

(22) Filed: Apr. 14, 2010

(65) Prior Publication Data
US 2010/0198852 A1    Aug. 5, 2010

Related U.S. Application Data

(63) Continuation of application No. PCT/JP2007/070264, filed on Oct. 17, 2007.

(51) Int. Cl.
G06F 17/30    (2006.01)
(52) U.S. Cl. ........................ 707/705; 707/758
(58) Field of Classification Search .................. 707/705, 707/758
See application file for complete search history.

(56) References Cited

U.S. PATENT DOCUMENTS

| | | | |
|---|---|---|---|
| 5,465,371 A * | 11/1995 | Fujii et al. ............................. | 1/1 |
| 5,995,963 A | 11/1999 | Nanba et al. | |
| 7,457,799 B2 | 11/2008 | Nagata et al. | |
| 2001/0014936 A1 | 8/2001 | Jinzaki | |

FOREIGN PATENT DOCUMENTS

| | | |
|---|---|---|
| JP | 6-139278 | 5/1994 |
| JP | 10-105576 | 4/1998 |
| JP | 2001-229172 | 8/2001 |
| JP | 2005-70911 | 3/2005 |
| JP | 2005-242668 | 9/2005 |

OTHER PUBLICATIONS

English language International Search Report for PCT/JP2007/070264, mailed on Nov. 27, 2007.

* cited by examiner

Primary Examiner — Charles Rones
Assistant Examiner — Fariborz Khoshnoodi
(74) Attorney, Agent, or Firm — Staas & Halsey LLP

(57) ABSTRACT

A search device used to search for a search keyword from an object to be searched based on an automaton generated in accordance with the search keyword, includes: a first memory region; a second memory region; an information generation part that generates third information from first information and second information; a determination part; and a selection part, wherein: a first state corresponding to the first information is read from the first memory region; fourth information and a second state corresponding to the third information are read from the second memory region; the determination part determines whether or not fifth information including the first information and the second information matches with the fourth information; and the selection part selects the first state when not match in the determination and when matches in the determination, selects the second state.

18 Claims, 13 Drawing Sheets

SEARCH KEYWORD AUTOMATON

DOCUMENT

···black···

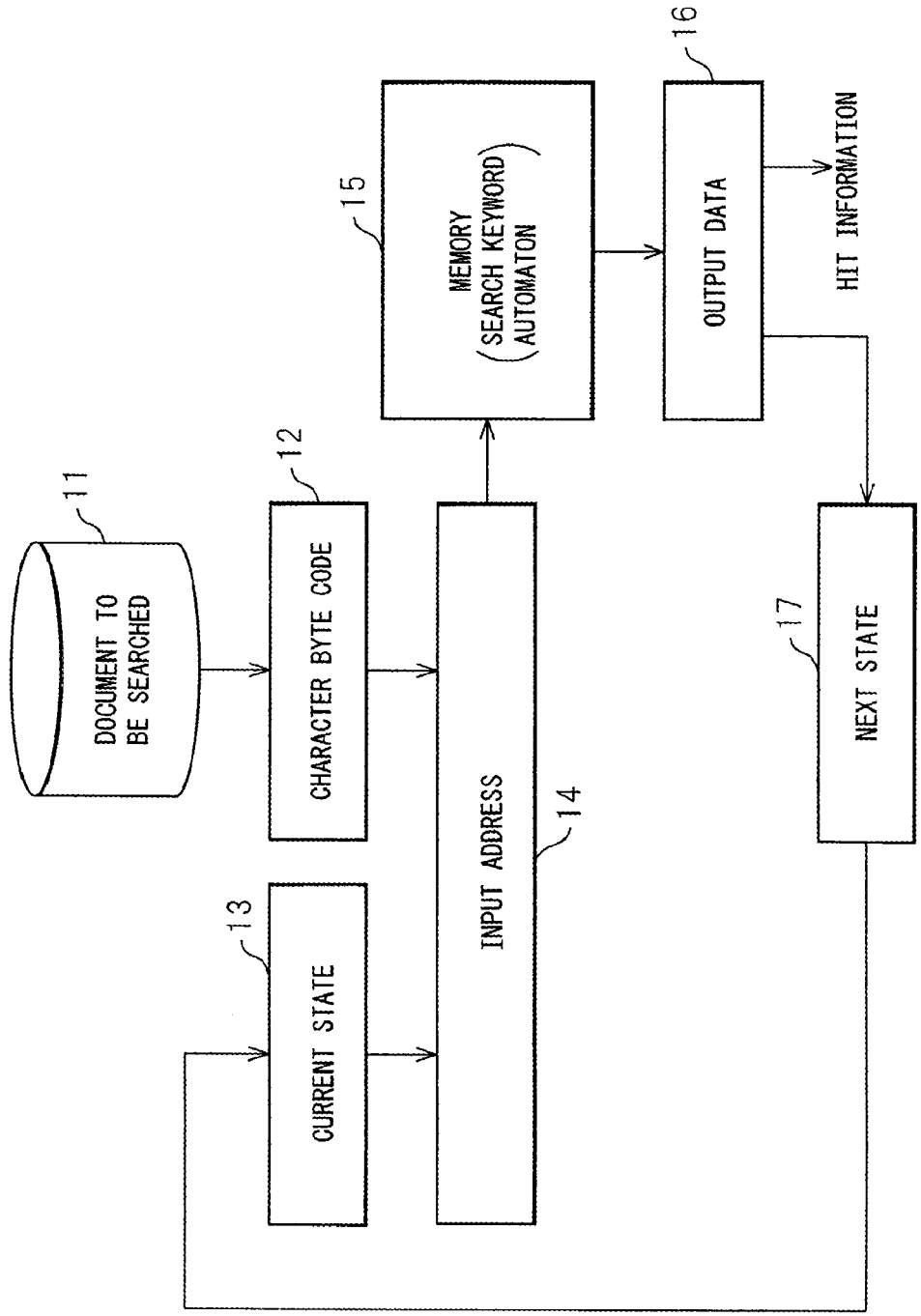

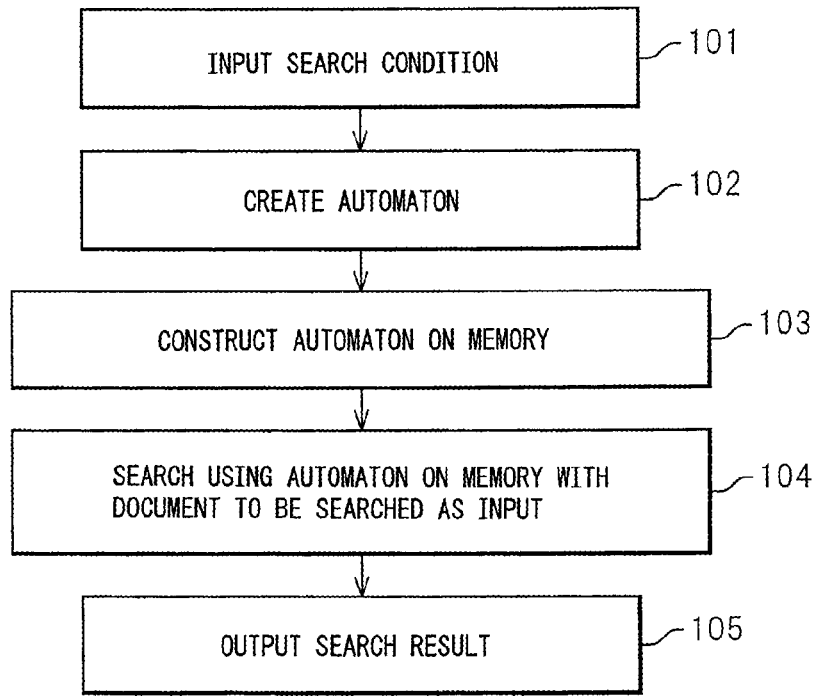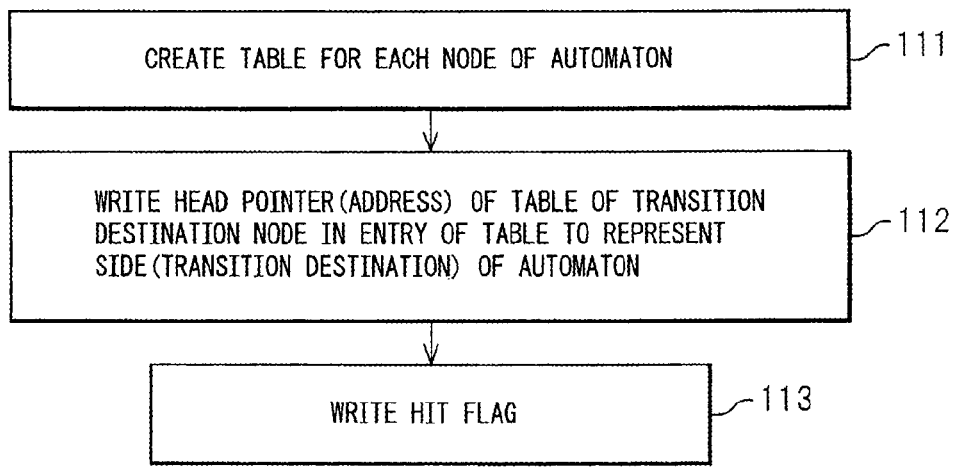

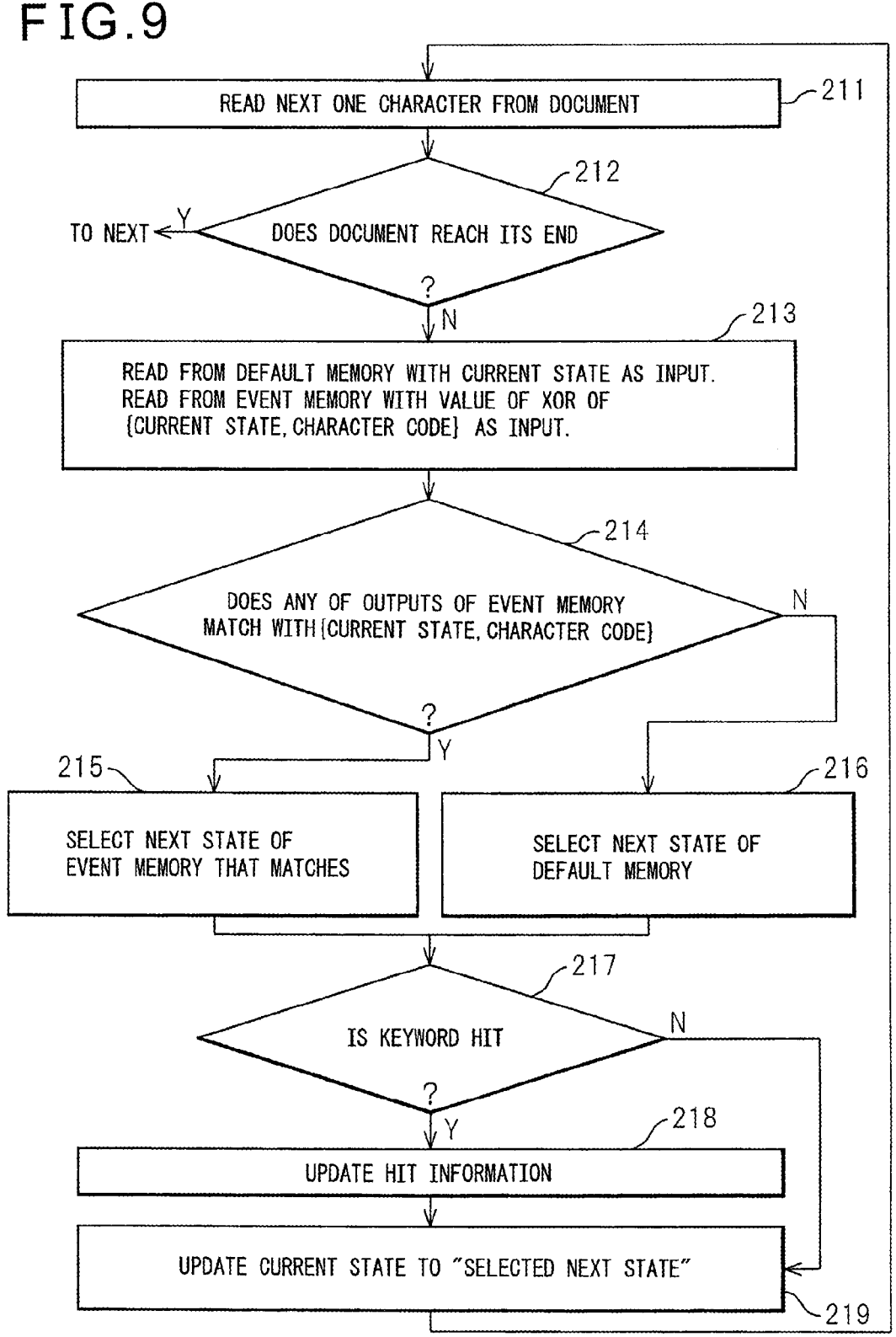

| TRANSITION DESTINATION INFORMATION | HIT |
|---|---|
| 0x00 | 0 |

| TAG (CURRENT STATE) | TRANSITION DESTINATION INFORMATION | HIT |
|---|---|---|
| – | – | – |
| – | – | – |
| 0x64(01100100) | 0x02 | 0x01 | 0 |
| – | – | – |
| 0x66(01100110) | 0x00 | 0x01 | 0 |
| 0x67(01100111) | 0x01 | 0x01 | 0 |
| – | – | – |
| ⋮ | ⋮ | |
| – | – | – |
| 0x6E(01101110) | 0x01 | 0x02 | 1 |
| – | – | – |
| – | – | – |
| – | – | – |

FIG.11

| | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| 0 | 0 | 0 | 0 | 0 | 0 | 0 | 0 | 0 | 1 | 0 | 0 | 0 | 0 | 0 | 0 | 0 |
| 1 | 0 | 0 | 0 | 0 | 0 | 0 | 0 | 0 | 0 | 0 | 0 | 1 | 1 | 0 | 0 | 0 |
| 2 | 0 | 0 | 0 | 0 | 0 | 0 | 0 | 0 | 0 | 0 | 0 | 0 | 1 | 0 | 0 | 0 |
| 3 | 0 | 1 | 1 | 0 | 0 | 1 | 0 | 0 | 1 | 0 | 0 | 0 | 0 | 1 | 0 | 0 |
| 4 | 0 | 0 | 0 | 0 | 0 | 0 | 0 | 0 | 0 | 0 | 0 | 0 | 0 | 0 | 0 | 0 |
| 5 | 0 | 0 | 0 | 0 | 1 | 1 | 0 | 0 | 0 | 0 | 0 | 0 | 1 | 0 | 0 | 0 |
| 6 | 0 | 0 | 1 | 0 | 0 | 1 | 0 | 1 | 0 | 0 | 0 | 0 | 1 | 1 | 0 | 1 |
| 7 | 1 | 0 | 1 | 1 | 0 | 0 | 1 | 1 | 0 | 1 | 0 | 0 | 0 | 0 | 0 | 1 |
| 8 | 0 | 0 | 0 | 0 | 0 | 1 | 1 | 0 | 0 | 0 | 0 | 0 | 0 | 0 | 0 | 0 |
| 9 | 0 | 0 | 0 | 0 | 0 | 1 | 0 | 0 | 0 | 0 | 0 | 0 | 0 | 0 | 0 | 0 |
| a | 0 | 0 | 1 | 0 | 0 | 0 | 0 | 0 | 0 | 0 | 0 | 0 | 0 | 0 | 0 | 0 |
| b | 0 | 0 | 1 | 0 | 0 | 0 | 0 | 1 | 0 | 0 | 0 | 0 | 0 | 0 | 0 | 0 |
| c | 0 | 0 | 0 | 0 | 1 | 1 | 0 | 0 | 0 | 1 | 0 | 0 | 0 | 0 | 0 | 0 |
| d | 0 | 0 | 0 | 0 | 0 | 0 | 0 | 0 | 0 | 1 | 0 | 0 | 0 | 1 | 0 | 0 |
| e | 0 | 0 | 0 | 0 | 0 | 0 | 1 | 0 | 0 | 0 | 0 | 0 | 1 | 1 | 0 | 0 |
| f | 0 | 0 | 0 | 0 | 1 | 1 | 0 | 0 | 0 | 0 | 0 | 0 | 0 | 0 | 0 | 0 |

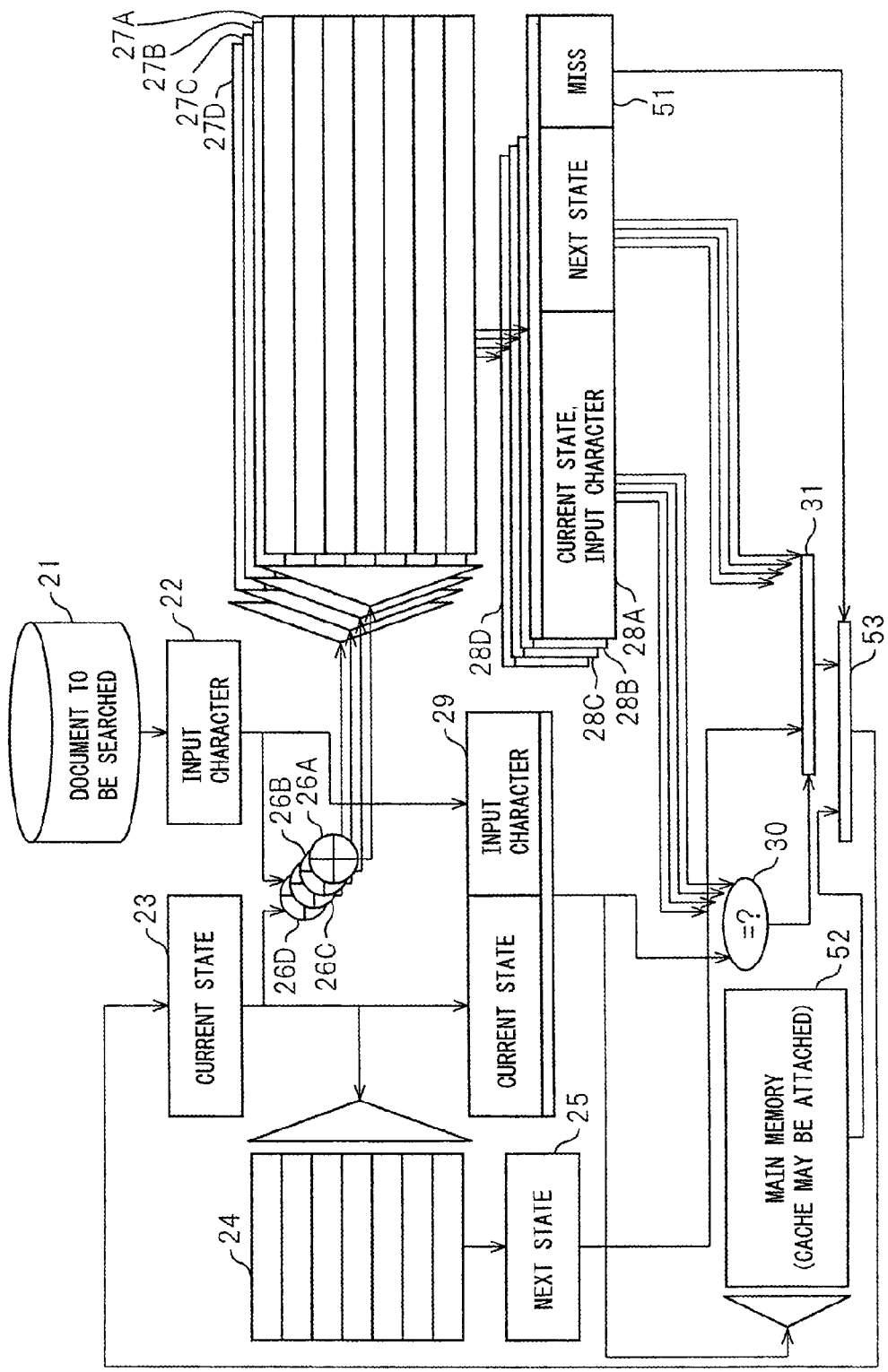

SEARCH DEVICE AND SEARCH METHOD

CROSS-REFERENCE TO RELATED APPLICATIONS

This application is a continuation application and is based upon PCT/JP2007/070264, filed on Oct. 17, 2007, the entire contents of which are incorporated herein by reference.

FIELD

The embodiments discussed herein are related to a search device and a search method for searching for a pattern from text.

BACKGROUND

Recently, the amount of information in various fields is increasing. In some fields, the amount of information is reaching the order of gigabytes to terabytes and it is becoming difficult to search for desired data from an enormous amount of data in a brief period of time.

Pattern matching used for searching for arbitrary text patterns is used in a variety of fields, such as word-processing software and database searches.

Conventionally, various techniques have been proposed for searches using pattern matching. Japanese Laid-open Patent Publication No. 2005-70911 describes a search device and a search method using deterministic finite automaton.

FIGS. 1A and 1B are diagrams explaining the Sigma algorithm, which is one of keyword search algorithms. FIG. 1A illustrates an example, in which keywords, such as "blue", "green", "red" and "yellow", are searched for from a document to be searched. As illustrated schematically, an automaton corresponding to each keyword condition is created. Specifically, an automaton is created, in which transition is made from the root denoted by 0 to the head characters "b", "g", "r" and "y" of the respective keywords, and transition is further made to the characters of the respective keyword strings. If the characters to the last one of each keyword are matched, the keyword string is searched for. The keyword string of "green" includes "re" and if there is "d" after this, it matches with "red", and therefore, there exists a path in which transition is made from "green" to "red" at "d" on the way to "green" as illustrated schematically.

Search starts from the root and if there is a keyword within the automaton, transition is made sequentially, and if a character that has nothing to do with the keyword is read, the search returns to the root. For example, when a document that includes "black" in FIG. 1B is input, transition is made to the head character "b" of "blue" and then transition is further made to the next "l", however, the next character is "a", and therefore, the search returns to the root. If the document includes a keyword string of the automata, transition is made to the last character of the keyword string and HIT information is output and thus the existence of the keyword string is found.

In the automaton search, the place of a character in each keyword string is denoted by a node or "state". For example, the root is denoted by state 1, "b" in "blue" is denoted by state 2 and "u" is denoted by state 4.

FIG. 2 is a diagram illustrating a schematic configuration of a search device that uses the deterministic finite automaton. A document to be searched 11 stored in a disc device, etc., is input and a character byte code 12 is taken out sequentially therefrom. In the following explanation, it is assumed that the character byte code is 8 bits and 256 entries are formed.

Further, an index that is a combination of a current state (data that indicates the state) 13 held in a register and the character byte code 12 is assumed to be an input address 14 of a memory 15 in which a search keyword automaton is formed. The memory 15 to which the input address 14 is input outputs output data 16 that includes a next state 17 and HIT information. The next state 17 is replaced with the current state 13.

FIGS. 3A and 3B are diagrams explaining the operation of the search device in FIG. 2. For the sake of simplification of explanation, an example is illustrated, in which a keyword string of "fo" is searched for. As illustrated in FIG. 3A, transition is made from state 1 to state 2 if "f" (0x66) appears, and transition is made to state 3 if "o" (0x6F) appears in state 2, and if "f" (0x66) appears again, state 2 is maintained and in other cases, the search returns to state 1.

This search keyword automata is illustrated in FIG. 3B. The character byte code is 8 bits and each state has 256 entries (addresses). Memory part M-X on the left-hand side indicates a transition destination from state 1 and memory part M-Y in the center indicates a transition destination from state 2, and memory part M-Z on the right-hand side indicates a transition destination from state 3. The memory part M-X stores a transition destination for an address that combines 0xXXXX part indicative of state 1, XX part indicative of a plurality of keyword strings, and 00-ff part indicative of the entry in state 1 of each keyword string. With 66 of 00-ff indicative of an entry, transition is made to state 2 and in other cases, state 1 is maintained again, and therefore, in 0xXXXX_XX66, the address 0xYYYY_YY00 of state 2 is stored and the address 0xXXXX_XX00 of state 1 is stored for the other addresses. The hit information HIT in the memory part M-X is N/A indicative of being not hit. As for the other keyword strings, they are stored after XX in the lowest three or four digits are changed.

Similarly, the memory part M-Y stores a transition destination for an address that combines address part 0xYYYY indicative of state 2, YY indicative of a plurality of keyword strings, and 00-ff indicative of the entry in state 2 of each keyword string. With 6f of 00-ff indicative of an entry, transition is made to state 3 and with 66, state 2 is maintained, and in other cases, the search returns to state 1, and therefore, in 0xYYYY_YY6f, the address 0xZZZZ_ZZ00 of state 3 is stored and the address 0xYYYY_YY00 of state 2 is stored in 0xYYYY_YY66, and the address 0xXXXX_XX00 of state 1 is stored for the other addresses. The hit information HIT in the memory part M-Y is N/A indicative of being not hit.

Similarly, the memory part M-Z stores a transition destination for an address that combines address part 0xZZZZ indicative of state 3, ZZ indicative of a plurality of keyword strings, and 00-ff indicative of the entry in state 3 of each keyword string. With 66 of 00-ff indicative of an entry, transition is made to state 2 and the search returns to state 1 in the other cases, and therefore, in 0xZZZZ_ZZ66, the address 0xYYYY_YY00 of state 2 is stored and the address 0xXXXX_XX00 of state 1 is stored for the other addresses. The hit information HIT in the memory part M-Y is HIT indicative of being hit. Consequently, if the search reaches the memory M-Z in state 3, the keyword exists.

FIG. 4 is a flowchart illustrating the processing of a search device that makes use of the above-mentioned automata and search processing using the same.

In step 101, a search condition is input. In the above-mentioned example, "fo" is input. In the example in FIG. 1, "blue", "green", "red" and "yellow" are input.

In step 102, an automation is created based on the input search condition, i.e., the keyword string.

In step 103, an automaton is constructed in a memory.

In step 104, a search is performed using the automaton in the memory with a document to be searched as an input.

In step 105, a search result is output.

FIG. 5 illustrates a flowchart illustrating the construction processing of the automaton in the memory in step 103 in more detail, illustrating, for example, processing to construct a table as illustrated in FIG. 3(B) in the memory.

In step 111, a table is created for each node (state) of the automaton.

In step 112, in order to represent a side (transition destination) of the automaton, a head point (address) of the table of a transition destination node is written in an entry of the table.

In step 113, a hit flag is written to the table in the last state.

FIG. 6 is a flowchart illustrating search processing using the automaton constructed in the memory in step 104 in more detail.

In step 121, next one character is read from the document to be searched and in step 122, whether it is the end of the document is determined. When it is the end of the document, the processing proceeds to step 105, and when not, the processing proceeds to step 123.

In step 123, data is read from the memory on which the automaton is constructed with the current state and the characteristic code of the read character as an input address.

In step 124, whether the keyword is hit in the data that is read is determined, i.e., whether a state that includes HIT information is reached is determined, and when not hit, the processing proceeds to step 126 and when hit, the processing proceeds to step 125.

In step 125, HIT information is updated.

In step 126, the "current state" is updated to the "next state" included in the data read in step 123 and the processing returns to step 121.

The construction of the search keyword automaton in the memory and the keyword search that makes use of the automaton are explained as above, however, an attempt is also made to speed up the search by preparing a plurality of memories on which the same search keyword automaton is constructed, dividing a document to be searched into a plurality of parts, supplying each part to each memory in parallel, and performing a search in parallel. It is also intended to speed up the search by loading the search keyword automaton on a cache memory.

The search device and the search method that make use of the conventional automaton described above have a problem that the size of the automaton is very large when the number of search expressions is large or when the search expression is complicated. When the size of the automaton increases, the amount of memory used increases, and there arises a problem that a cache error occurs frequently at the time of processing by a processor, etc., and therefore, the search speed is reduced, or a problem that the cost of hardware is increased.

Japanese Laid-open Patent Publication No. 2005-242668 describes a search device and a search method that reduces the size of the memory of automaton and improves throughput by applying a hash function to text.

However, the method described in Japanese Laid-open Patent Publication No. 2005-242668 uses the hash function, and therefore, there is a possibility that a text character string that is not matched is detected as a matched one and further, there is a problem that the memory size of an automaton may not be reduced sufficiently.

SUMMARY

According to an aspect of the embodiment, a search device used to search for a search keyword from an object to be searched based on an automaton generated in accordance with the search keyword, includes: a first memory region; a second memory region; an information generation part that generates third information from first information and second information; a determination part; and a selection part, wherein: a first state corresponding to the first information is read from the first memory region; fourth information and a second state corresponding to the third information are read from the second memory region; the determination part determines whether or not fifth information including the first information and the second information matches with the fourth information; and the selection part selects the first state when not match in the determination and when matches in the determination, selects the second state.

BRIEF DESCRIPTION OF THE DRAWINGS

FIG. 2 is a diagram illustrating a general configuration of a conventional search device in which an automaton is formed in a memory;

FIG. 4 is a flowchart illustrating processing in a conventional search device;

FIG. 5 is a flowchart illustrating construction processing of an automaton in a memory of a conventional search device;

FIG. 9 is a flowchart illustrating search processing of an automaton in the first embodiment;

FIG. 11 is a diagram illustrating a data example of an event memory in the first embodiment;

FIG. 14 is a diagram illustrating a configuration of a search device in a fourth embodiment.

DESCRIPTION OF EMBODIMENTS

The embodiments are explained below with reference to the drawings. In the following explanation, for the sake of simplification, the memory region is referred to as a memory.

Figure 7:
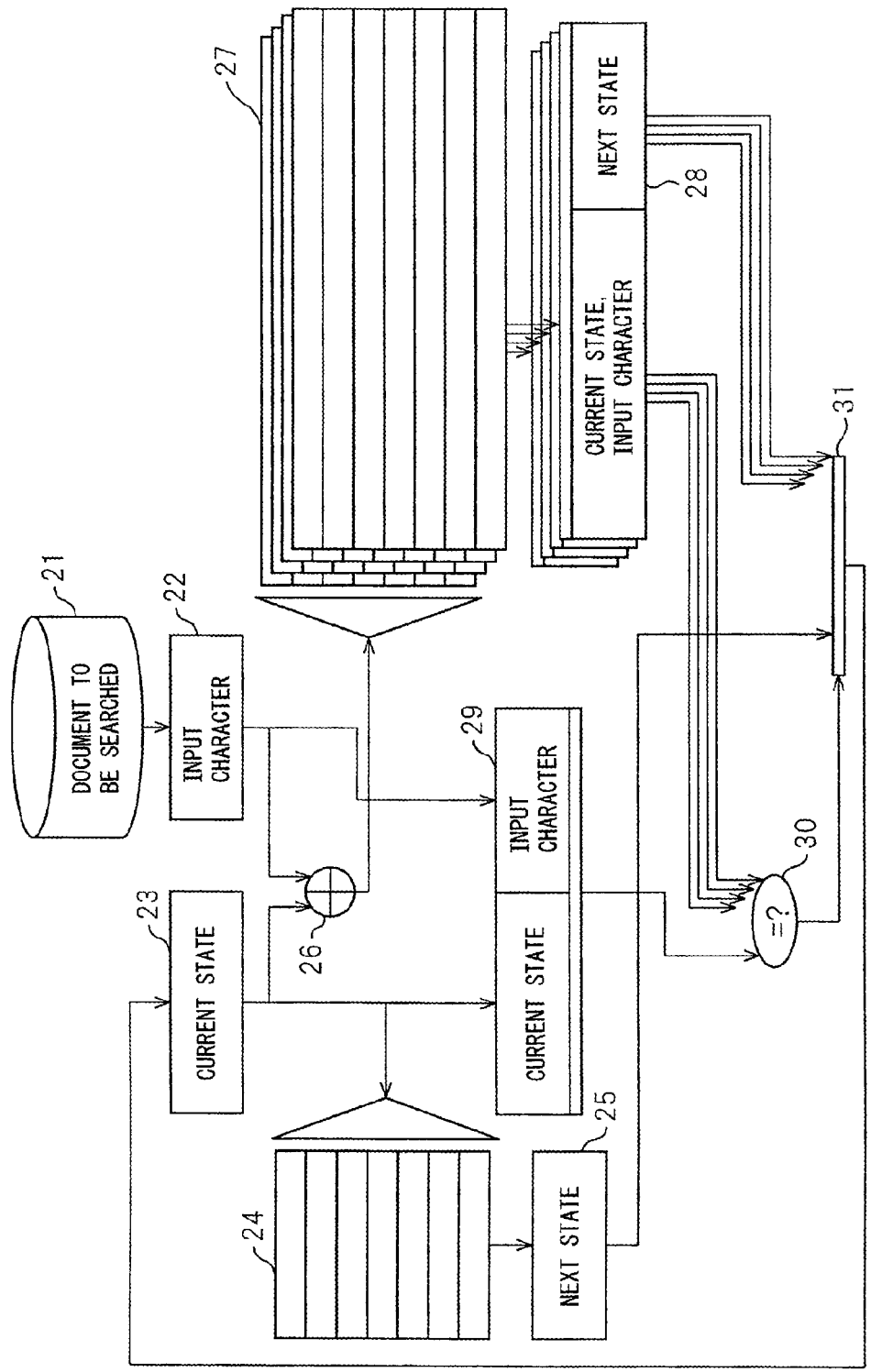
FIG. 7 is a diagram illustrating a configuration of a search device in a first embodiment.

FIG. 7 is a diagram illustrating a configuration of a search device in a first embodiment. A document to be searched 21 stored in a disc device, etc., is input and an input character (byte code) 22 is taken out sequentially therefrom. In a register, a current state 23 is held. A default memory 24 receives the current state 23 as an input and stores a default transition destination, that is a state corresponding to the root, and outputs the state as a next state 25.

The input character 22 and the current state 23 are input to a hash device 26 and at the same time, input to a fifth information register 29. The hash device 26 is an XOR circuit and computes an exclusive OR of the current state (first information) 23 and the input character (second information) 22 and generates an address (third information) to access an event memory 27. The event memory 27 is a memory used to configure an automaton of keyword strings and stores a set of the (current) state and character, the next state, which is the next transition destination, and HIT information at a position having a value of XOR of the character of the keyword string and the place of the character (state) in the keyword string as an address, and stores 0 at the other positions. The event memory 27 outputs stored data in accordance with the address at the time of access, and when a value of XOR of the keyword string and the state is input as an address, the event memory 27 outputs the set of the state of keyword string and the character, the next state, and output data 28 including the HIT information, and outputs zero data when the other addresses are input. When the HIT information is output, it is found that the keyword string exists.

It is desirable to realize the default memory 24 and the event memory 27 on a cache memory. As described above, a first memory region and a second memory region may be formed as memories independent of each other, or may be formed in one and the same memory, and this also applies to the default memory 24 corresponding to the first memory region and the event memory 27 corresponding to the second memory region. Because of this, it is desirable for the default memory 24 and the event memory 27 to be formed as cache memories independent of each other or to be realized in one and the same cache memory.

Of the output data 28 of the event memory 27, the set of state and character is compared with the set of the current state and the input character held in the fifth information register 29 and whether they match with each other is determined. When they match with each other, it indicates that a transition destination exists other than the root determined by the current state 23 and the input character 22, and therefore, the next state of the output data 28 of the event memory 27 is selected by a selection circuit 31. When they do not match with each other, it indicates that no transition destination exists other than the root determined by the current state 23 and the input character 22, i.e., the state is the default state, and therefore, the next state output from the default memory 24 is selected by the selection circuit 31. The selected next state is input to the register that stores the current state 23. Due to this, the current state is replaced with the selected next state.

Automaton construction processing and search processing using the automaton in a search device in the first embodiment is the same as the flowchart in FIG. 4, however, the contents in step 103 and step 104 are different.

Figure 8:
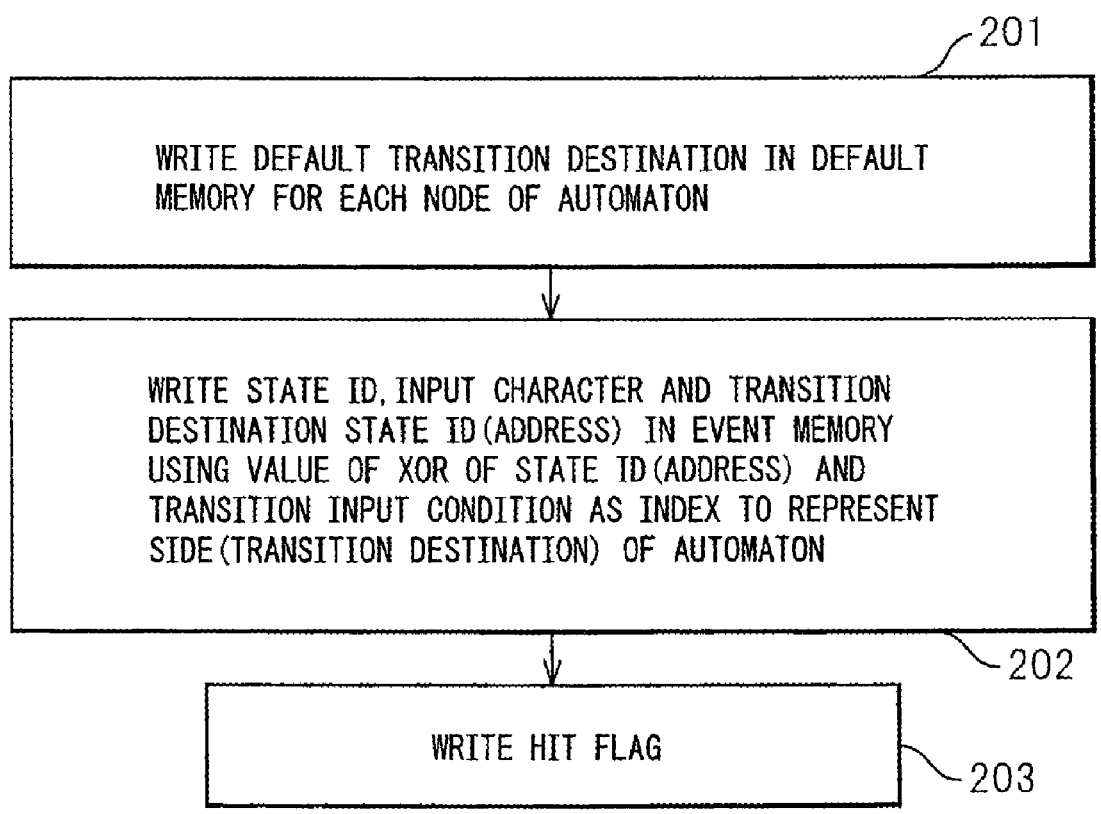
FIG. 8 is a flowchart illustrating construction processing of an automaton in the first embodiment.

FIG. 8 is a flowchart illustrating the automaton construction processing in the search device in the first embodiment.

In step 201, a default transition destination is written to the default memory 24 for each node of the automaton. The default transition destination corresponds to the root of each keyword string, and therefore, one for each keyword string.

In step 202, in order to represent a side (transition destination) of the automaton other than the default, a state ID (address), input character and transition destination state (next state) ID (address) are written to the event memory 27 with the XOR value of the state ID (address) of each keyword string and a transition input condition (character) as an index (address).

In step 203, a hit flag is written to the last state of the event memory 27.

In the above-described manner, writing of data to the default memory 24 and the event memory 27, i.e., the construction of the automaton is completed.

FIG. 9 is a flowchart illustrating search processing using the constructed automaton in more detail.

In step 211, the next one character is read from a document to be searched.

In step 212, when the character read in step 211 does not exist, it is determined that the document reaches the end, and when the read character exists, the processing proceeds to step 213.

In step 213, the default memory 24 is accessed using the current state 23 as an input and the default transition destination, that is, the next state 25 is read. Further, the XOR value of the current state 23 and the input character (one byte) 22 is computed and the event memory 27 is accessed using the XOR value as an input and the stored information is read. In the information stored in a position number having the XOR value of the state ID (address) and the transition input condition (character) of each keyword string as an address, the set of the state ID and the input character code, the next state and HIT information are stored, and in the information stored in the other addresses, zero is stored. Consequently, when the current state 23 and the input character code 22 are the same as the state and the transition condition (character) of the keyword string, the data output 28 other than zero is obtained when the event memory 27 is accessed with the XOR value, and when the current state 23 and the input character code 22 are not the same as the state and the transition condition (character) of the keyword string, zero is output as the output data 28. The output data 28 also includes the next state and HIT information.

In step 214, whether either of the output data 28 of the event memory 27 matches with the current state 23 and the input character code 22 is determined, and when matches, the processing proceeds to step 215, and when not, the processing proceeds to step 216.

In step 215, the selector 31 selects the next state included in the output data 28 of the event memory 27 that matches.

In step 216, the selector 31 selects the next state 25 output from the default memory 24.

In step 217, whether the HIT information of the output data 28 of the event memory 27 hits the keyword is determined, and when hit, the processing proceeds to step 218, and when not, the processing proceeds to step 219.

In step 218, the HIT information is updated to "HIT" and the processing proceeds to step 219.

In step 219, the current state 23 is updated to the selected "next state" and the processing returns to step 211.

By repeating the processing described above, the existence of the keyword in the document to be searched is detected.

FIG. 10 is a diagram explaining processing in the first embodiment using an example.

Figures 1A, 1B:
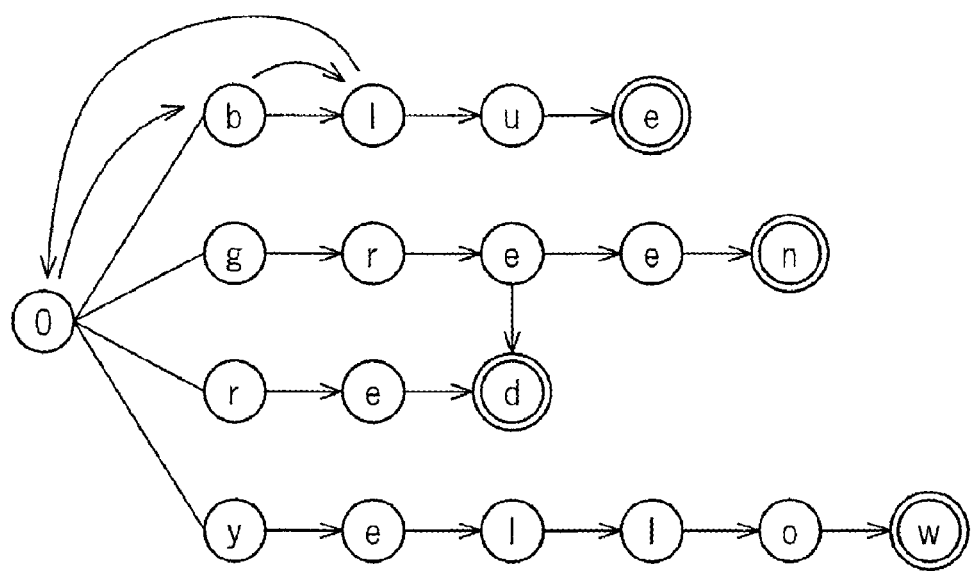
FIGS. 1A and 1B are diagrams explaining the Sigma algorithm, which is an example of keyword search algorithms by an automaton.
Figure 3A:
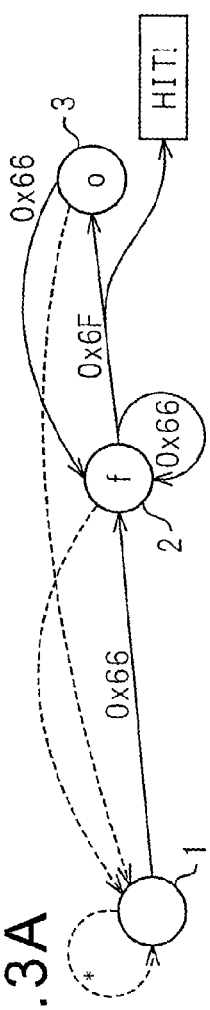
FIGS. 3A and 3B are diagrams illustrating the transition diagram of the automaton in FIG. 1 and data in a memory.
Figure 3B:
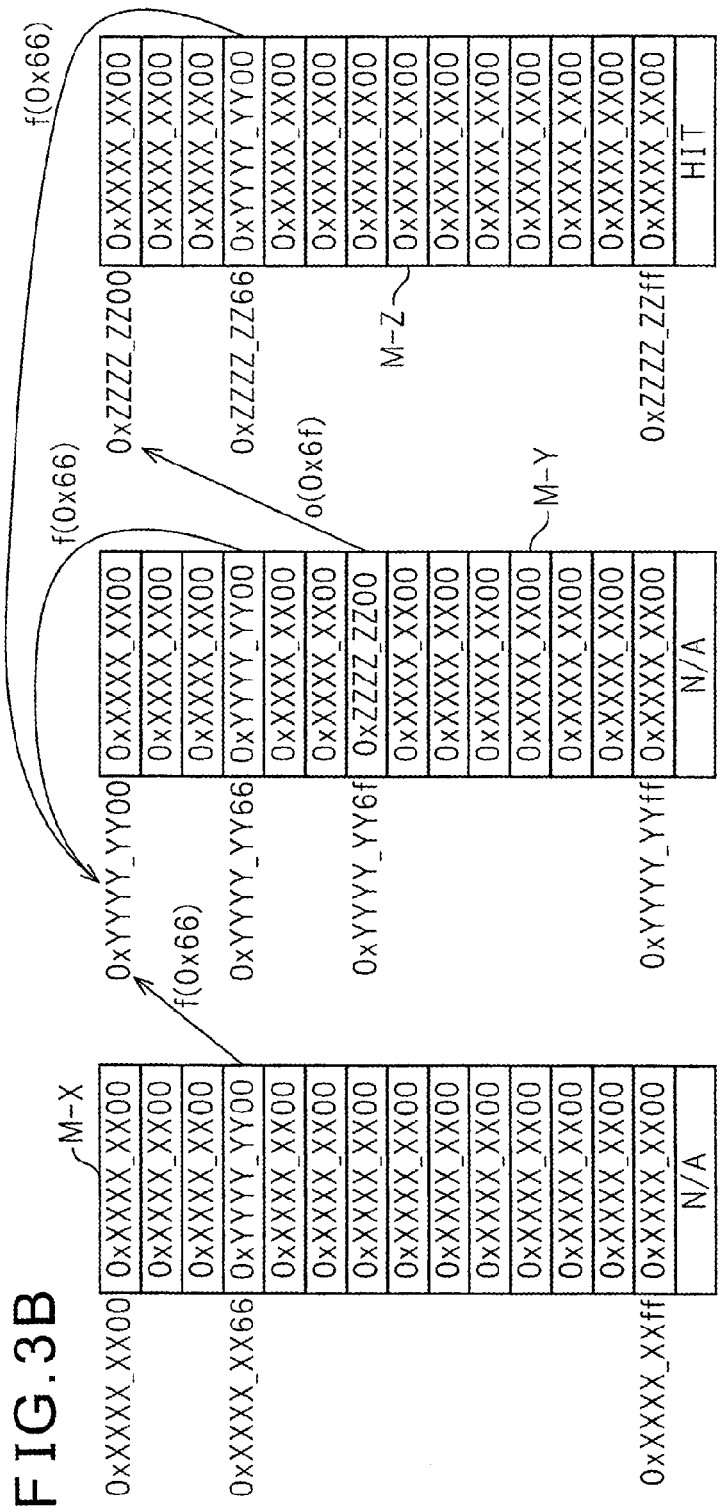
Figure 6:
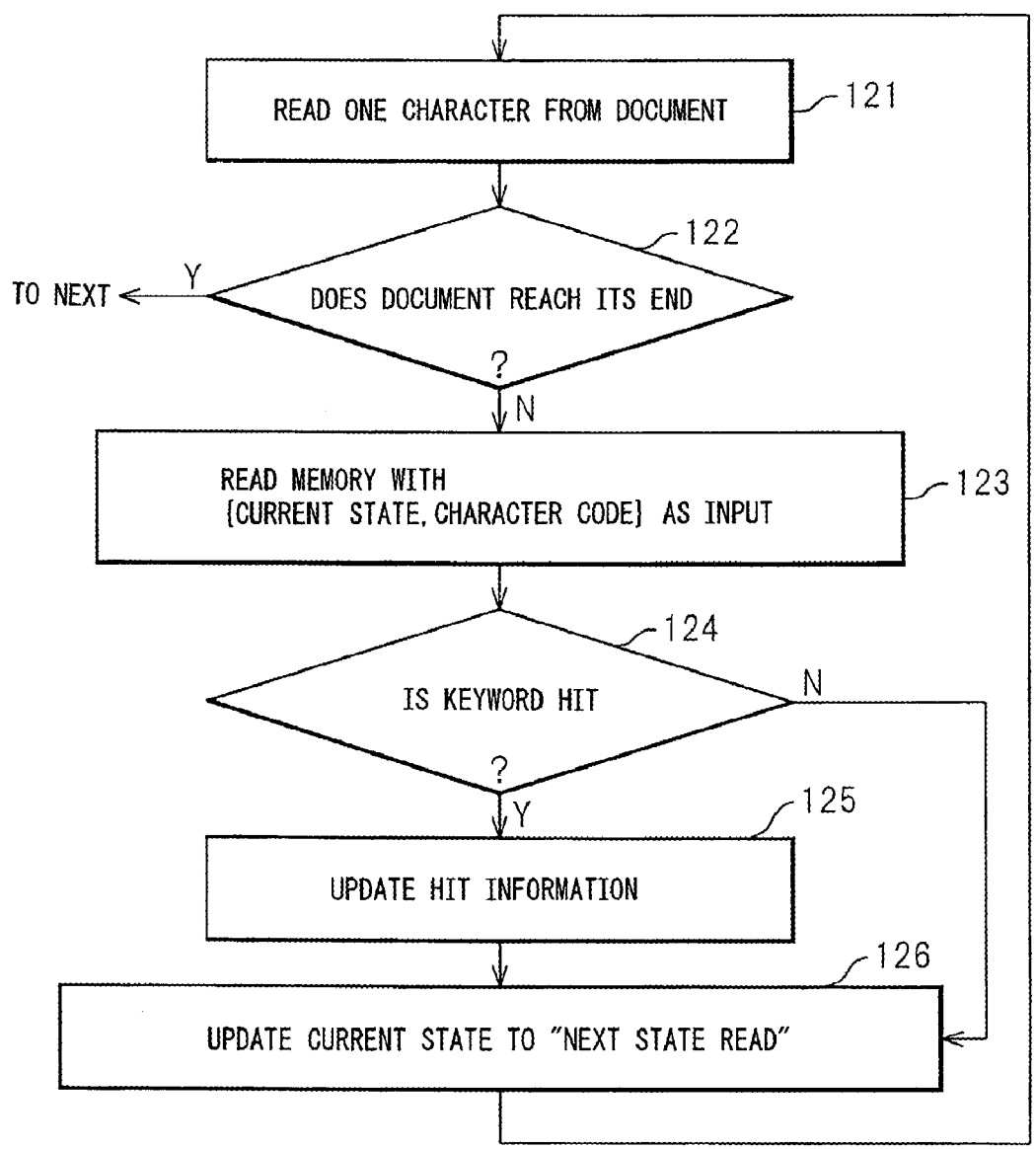
FIG. 6 is flowchart illustrating search processing using an automaton in a conventional search device.
Figures 10A, 10B, 10C:
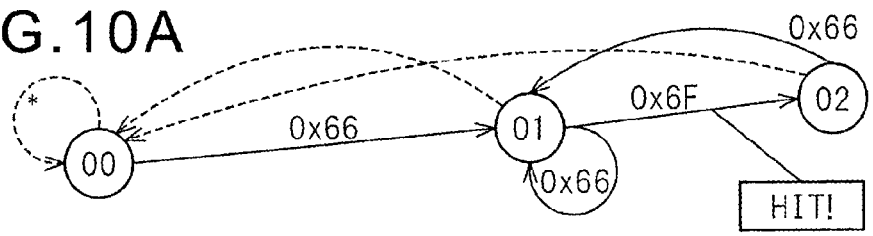
FIGS. 10A to 10C are diagrams illustrating an example of an automaton and data in a memory in the first embodiment.

FIG. 10(A) is a diagram illustrating the automaton used to search for a keyword "fo" and the content of the stored data in the default memory 24 and the event memory 27 as in FIG. 3.

As illustrated in FIG. 10(A), all of the dotted lines that indicate a transition destination of an input for which no automaton is defined (not a keyword) extend toward 0x00 node, and therefore, there is one entry in the default memory 24, and as illustrated in FIG. 10(B), transition destination information 0x00 and HIT information indicative of being not hit are stored. It is desired for the default memory 24 to store the information described above as to one keyword.

The event memory 27 has one configuration of 256 entries of 8 bits and defines that index (address)=current state ID xor input character byte code as the hashing function. The ID of the current state is held as a tag and the input character byte code is not held as a tag. This is because the input character byte code may be computed calculated from the index (address) and the current state ID, and in the configuration in FIG. 7, a computation mechanism is provided, which computes from the current state ID output from the event memory 27 and the input character byte code 22 and inserts it into the output data 28. It may also be possible to store the input character byte code 22 in the event memory 27, however, in this case, the memory size is increased accordingly.

The stored data in the event memory 27 of the automaton in FIG. 10(A) is as illustrated in FIG. 10(C). The first state is denoted by 0x00, "f" is 0x66 and its hashing (XOR) value is 0x66, and therefore, in the address 0x66, the current state 0x00 is stored as a tag and the second state 0x01 is stored as transition destination information, and 0 (not hit) is stored as HIT information.

From the second state 0x01, the same state is maintained with "f" 0x66, that is, transition is made to the second state 0x01, and therefore, the XOR value is 0x67 and the tag 0x01 and the transition destination information 0x01 are stored in the address 0x67. Further, from the second state 0x01, transition is made to the third state 0x02 with "o" 0x6F, and therefore, the XOR value is 0x6E and the tag 0x01 and the transition destination information 0x02 are stored in the address 0x6E. Furthermore, from the third state 0x02, transition is made to the second state 0x01 with "f" 0x66, and therefore, the XOR value is 0x64 and the tag 0x02 and the transition destination information 0x01 are stored in the address 0x64.

Next, a case where an input character string is "afaffafo" and automaton processing to search for "fo" therefrom is performed is explained.

For an input "a(0x61)", the index of the event memory 27 is 0x61 and no entry is stored, and therefore, the next state (transition destination information) 0x00 output from the default memory 24 is selected and its HIT information is 0. The current state is 0x00.

For an input "f(0x66)", the index of the event memory 27 is 0x66, the tag is 0x00, the next state (transition destination information) is 0x01, and its HIT information is 0. The tag and the current state match with each other, and therefore, HIT information is 0 and the current state is 0x01.

For the next input "a(0x61)", the index of the event memory 27 is 0x60 and no entry is stored, and therefore, the next state (transition destination information) 0x00 output from the default memory 24 is selected and its HIT information is 0. The current state is 0x00.

For the next input "f(0x66)", the index of the event memory 27 is 0x66, the tag is 0x00, the next state (transition destination information) is 0x01, and its HIT information is 0. The tag and the current state match with each other, and therefore, HIT information is 0 and the current state is 0x01.

For the next input "f(0x66)", the index of the event memory 27 is 0x67, the tag is 0x01, the next state (transition destination information) is 0x01, and its HIT information is 0. The tag and the current state match with each other, and therefore, HIT information is 0 and the current state is 0x01.

For the next input "a(0x61)", the index of the event memory 27 is 0x60 and no entry is stored, and therefore, the next state (transition destination information) 0x00 output from the default memory 24 is selected and its HIT information is 0. The current state is 0x00.

For the next input "f(0x66)", the index of the event memory 27 is 0x66, the tag is 0x00, the next state (transition destination information) is 0x01, and its HIT information is 0. The tag and the current state match with each other, and therefore, HIT information is 0 and the current state is 0x01.

For a next input "o(0x6F)", the index of the event memory 27 is 0x6E, the tag is 0x01, the next state (transition destination information) is 0x01, and its HIT information is 1. The tag and the current state match with each other, and therefore, HIT information is 1 and the current state is 0x01.

The case where "fo" is searched for is explained as above, and a case of an automaton used to search for a number of keywords is the same as described above. For example, FIG. 11 illustrates a use distribution (index to be used) of the event memory 27 that stores an automaton used to search for keywords "blue", "red", "yellow", "orange", "green", "purple" and "white". As illustrated schematically, there is still a margin for entry.

When an automaton as illustrated in FIG. 11 is realized by the prior art, a memory size of about 36 KB may be necessary, however, in the present embodiment, the default memory 24 desires 144 B and the event memory 27 desires 2,048 B, i.e., 2.19 KB in total, and thus, the memory size may be reduced to about 1/16.

Generally, in the prior art, if it is assumed that the character code size is n, the number of keyword characters is k, the state ID size is m, then, the memory capacity is expressed as $2^n \times (k+1) \times m$. When n=8 (bits), k=100, and m=4, the memory capacity is about 100 KB.

In contrast to this, according to the first embodiment, when the tag size is s, the memory capacity is $(k+1) \times m + (k+\alpha) \times (s+m)$. When s=100, the memory capacity is about 2.8 KB. Normally, the hash value has deviation, and therefore, the desired amount of memory may be a few multiples of the above, however, even so, it is possible to considerably reduce the memory capacity.

Figure 12:
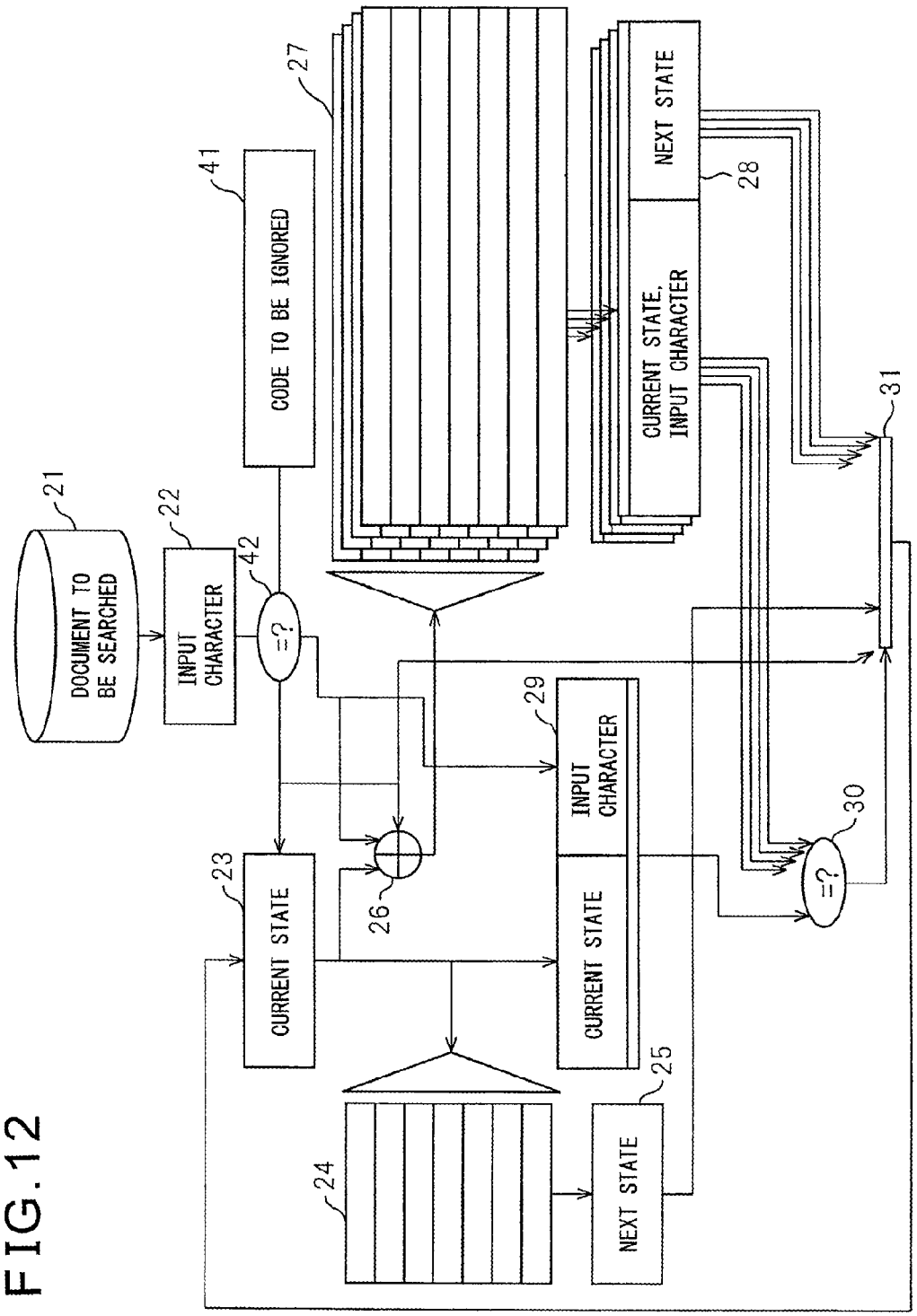
FIG. 12 is a diagram illustrating a configuration of a search device in a second embodiment.

FIG. 12 is a diagram illustrating a configuration of a search device in a second embodiment. The search device differs from that in the first embodiment in that a code 41 that is ignored in a search, such as a line feed symbol, stored in the register is compared with the input character code read from the document to be searched 21 by a comparator 42 and when they match with each other, the input character code is not subjected to search processing and each part is instructed to maintain the current state. Due to this, it may be possible to omit wasteful search processing.

Figure 13:
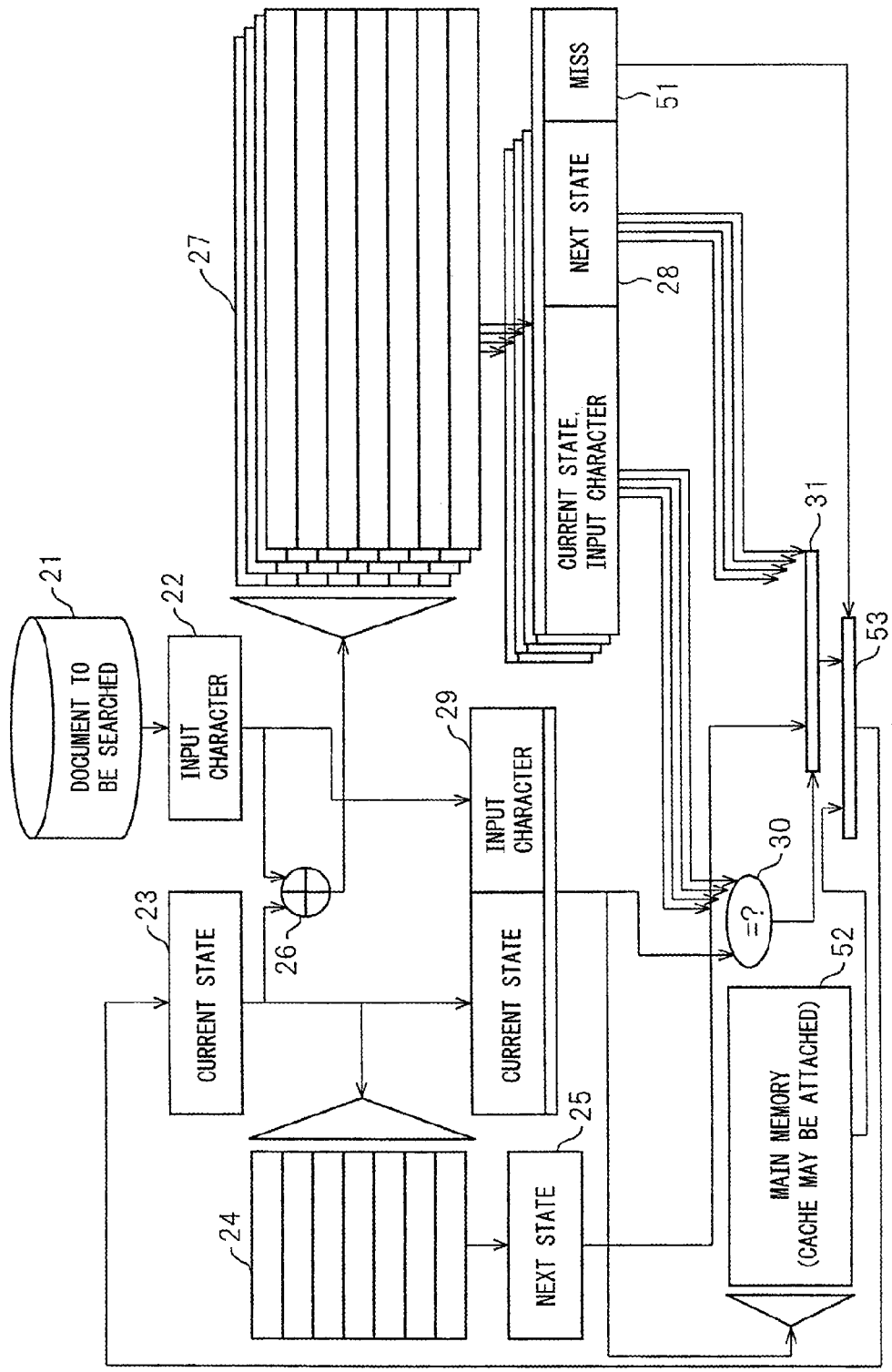
FIG. 13 is a diagram illustrating a configuration of a search device in a third embodiment.

FIG. 13 is a diagram illustrating a configuration of a search device in a third embodiment. The search device differs from that in the first embodiment in that a third memory 52 is provided and an automaton used to search for keywords that may not be accommodated in the event memory 27 is constructed in the third memory 52, and a second selection circuit 53 is provided, which selects one of the output of the selection circuit 31 and the output of the third memory 52. The third memory 52 is an automaton similar to that in the conventional example illustrated in FIG. 2 and accessed with the current state 23 and the input character 22 as an address. In other words, the third memory 52 is not accessed with a hashed address.

The event memory 27 has a miss flag and when the third memory 52 is provided, the miss flag is set to 1.

As in the first embodiment, whether an input character is a character of the keyword string stored in the event memory 27 is determined. When the input character is the character of the keyword string stored in the event memory 27, the selection circuit 53 selects and outputs the output of the selection circuit 31. When the input character is not the character of the keyword string stored in the event memory 27 but a character of the keyword string of the automaton constructed in the main memory 52, the selection circuit 53 selects and outputs the output of the main memory 52. When the input character is not the character of the keyword string stored in the event memory 27 or the character of the keyword string of the automaton constructed in the main memory 52, the selection circuit 53 selects the output of the selection circuit 31, i.e., selects and outputs the next state 25 output from the default memory 24. The current state 23 is replaced with the next state output from the selection circuit 53. In FIG. 13, although the explanation of HIT information is omitted, HIT information is stored also in the main memory 52 and subjected to the same processing as in the first embodiment.

The main memory 52 may be formed as an independent memory of the default memory 24 and the event memory 27, or may be formed in the same memory, however, it is desirable to realize the default memory 24 and the event memory 27 by a cache memory and the main memory 52 by a memory different from that and the access speed of which is low. Further, the main memory 52 may be formed in the disc device.

FIG. 14 is a diagram illustrating a configuration of a search device in a fourth embodiment. The search device differs from that in the third embodiment in that that hash device (XOR) is configured by a plurality of hash devices 26A to 26A that compute different hash functions and the event memory is configured by event memory units 27A to 27D corresponding to the plurality of the hash devices 26A to 26D.

By providing the plurality of different hash devices 26A to 26D and also providing the plurality of event memories (regions) 27A to 27D corresponding thereto, it may be possible to avoid the allocation of different events (characters of a keyword string) to one and the same entry as much as possible and thus the frequency of entry interference may be reduced.

In the case of the fourth embodiment, it is desirable to store information in the plurality of event memories 27A to 27D by comparing the numbers of empty entries of respective memories and storing information in order from the memory with the largest number of empty entries so that the numbers of empty entries of the plurality of memories are approximately the same.

As above, the embodiments are explained, however, it is obvious that there may be various modified examples. For example, it is also possible to apply the features of the second embodiment to the third and fourth embodiments.

According to the embodiments, a search device and a search method capable of retrieving desired data from an enormous number of documents at high speed and with a less memory size and are realized. Further, according to the embodiments, the memory size of a deterministic finite automaton may be reduced and the efficiency of memory use and cache use may be increased.

Further, as described above, in a search device and a search method of the embodiments, a default memory region (first memory region) is prepared specially for entries of the same transition destination as a default transition destination, and an event memory region (second memory region) is prepared separately from the default memory region in order to represent a transition destination, which is not the default one in relation to a keyword. In the default memory region, a default transition destination is stored for one entry or for a certain input.

The first memory region and the second memory region may be formed as memories independent of each other or formed in one and the same memory. This also applies to a third memory region, to be described above.

As illustrated in FIG. 3, according to the conventional example, in the memory on which an automaton is constructed, the transition destination for most of the input characters (entries) is the first state, i.e., the root. Consequently, if this part may be represented altogether, it may be possible to considerably reduce the size of the memory. Because of this, in the embodiments, an event memory to which information (first information) indicative of the current state (first state) and an input character (second information) that are hashed are input, and information including a transition destination in relation to a search keyword is stored therein, and the other inputs are stored in a default memory as default transition destinations altogether. The default transition destinations that occupy a large part are put into a single body, and therefore, it may be possible to considerably reduce the memory size. Further, in accordance with the reduction in memory size, it is also possible to make an attempt to increase the speed of search processing.

To the event memory, information (third information), which includes the information (first information) indicative of the current state (first state) and the input character (second information) that are hashed, is input and as information for an entry, information (fourth information) for identifying the input character and/or the current state is registered as a tag, in addition to information about transition destination (second state), and thus, a transition that is not a default is represented while suppressing the memory size. Due to this, may be possible to reduce an error resulting from hashing that an erroneous determination is made in which matching is erroneously determined even when not matched because different events are allocated to one and the same entry due to hashing, i.e., entry interference occurs.

Further, in order to reduce as much as possible different events from being allocated to one and the same entry due to hashing, it may also be possible to prepare a plurality of event memories to reduce entry interference by giving them associations. Furthermore, it may be possible to reduce the degree of entry interference by changing the hash function for each association.

In this case, when information is stored in the unit of the plurality of event memories, it is desirable to store in the order from the memory unit with the largest number of empty entries by comparing the numbers of empty entries of respective units so that the numbers of empty entries of the plurality of units are approximately the same.

Further, when the input character read from a document to be searched is a special character code, such as a line feed symbol, it may also be possible to maintain the current state without performing processing.

Further, a third memory is prepared, in which keyword strings that may not be stored in the event memory are stored, and a flag indicative of the existence of the third memory is provided in the event memory. Then, when the set of the current state and the input character does not match with the information from the event memory, the third memory is accessed and when there is no keyword therein, transition is made to the default transition destination.

The embodiments may be applied to any deterministic finite automaton and may also be applied to word processing software and database search using such an automaton.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment of the present invention have been described in detail, it should be understood that the various changes, substitutions, and alterations could be made hereto without departing from the spirit and scope of the invention.

What is claimed is:

1. A search device used to search for a search keyword from an object searched based on an automaton generated in accordance with the search keyword, the search device comprising:
   an input determination part that determines whether an input code corresponding to a character of the object searched matches a predetermined code;
   a first memory region;
   a second memory region;
   an information generation part that generates third information from first information and second information;
   a determination part; and
   a selection part, wherein:
   a first state corresponding to the first information is read from the first memory region;
   fourth information and a second state corresponding to the third information are read from the second memory region;
   the information generation part, the determination part and the selection part do not perform any processing on the input code determined to match by the input determination part nor update a current state,
   the determination part determines whether fifth information including the first information and the second information matches the fourth information; and
   the selection part selects the first state when no match is found by the determination part and selects the second state when a match is found by the determination part.

2. The search device according to claim 1, wherein: the first information is the current state of a search;
   the second information is a code corresponding to the character of the object searched;
   the information generation part generates the third information by hashing the current state and the code by a predetermined method;
   the fourth information includes a code corresponding to the current state, a code corresponding to the character of the object searched, or a code corresponding to the current state and the character of the object searched.

3. The search device according to claim 2, wherein:
   the second memory region has a plurality of memory regions; and
   the information generation part generates the third information by a hashing method corresponding to each of the plurality of memory regions.

4. The search device according to claim 3, wherein the plurality of memory regions of the second memory region have approximately the same numbers of empty entries.

5. The search device according to claim 1,
   further comprising a third memory region that stores the fourth information and the second state that cannot be stored in the second memory region,
   wherein the second memory region has a flag indicative of the existence of the third memory region.

6. The search device according to claim 5, wherein when the fourth information and the fifth information read from the second memory region do not match with each other:
   the third state is read from the third memory region; and
   the selection part selects the third state.

7. The search device according to claim 5, wherein the first to third memory regions further store output information.

8. A search method of searching for a search keyword from an object searched based on an automaton generated in accordance with the search keyword, the search method comprising:
   determining whether an input code corresponding to the character of the object searched matches a predetermined code;
   making a first access to a first memory region in accordance with a first address corresponding to a current state of the automaton to read a second address;
   generating a third address by hashing the first address and a code corresponding to a character of an object searched;
   making a second access to a second memory region in accordance with the third address to read sixth address information including a fourth address and a fifth address;
   comparing the first address with the fourth address;
   taking the second address as a next state to which transition is made in the automaton
   when the first address and the fourth address do not match with each other; taking the fifth address as the next state to which transition is made in the automaton when the first address and the fourth address match with each other, wherein when the input code matches the predetermined code, the input code is not subjected to processing and the current state is not updated.

9. The search method according to claim 8, wherein:
   the fourth address corresponds to the current state; and
   the fifth address corresponds to the next state to which the transition is made.

10. The search method according to claim 8, wherein:
    the second memory region has a plurality of memory regions; and
    the hashing method of generating the third address from the first address and the code corresponding to the character of the object searched is changed to a different one corresponding to each of the plurality of memory regions.

11. The search method according to claim 10, wherein the sixth address information is recorded in the plurality of memory regions of the second memory region so that the numbers of empty entries are approximately the same.

12. The search method according to claim 8, comprising, when the fourth information and the fifth information read from the second memory region do not match with each other,
    making a third access to a third memory region that stores the sixth address that is not recorded in the second memory region, with the first address and the code corresponding to the character of the object searched to read a ninth address including a seventh address and a eighth address;
    comparing the first address with the seventh address;
    taking the second address as a next state to which transition is made in the automaton when the first address and the seventh address do not match with each other; and
    taking the eighth address as the next state to which transition is made in the automaton when the first address and the seventh address match with each other.

13. The search method according to claim 12, wherein the second address, the sixth address information and the ninth address further have output information.

14. A search method of searching for a search keyword from an object searched based on an automaton generated in accordance with the search keyword, the search method comprising:
    determining whether an input code corresponding to the character of the object searched matches a predetermined code and performing following operations only if there is no match;

generating a first tag from a first address corresponding to a first node of the automaton and a code corresponding to the first node;

storing information in a second memory region, which information including the first tag and a second address corresponding to a second node that is a next transition destination of the first node;

storing a third address corresponding to a third code not selected as the transition destination of the second memory region in a first memory; and selecting first information read from the first memory region and second information read from the second memory region based on a comparison of a second tag including the first address input and the code with the first tag.

15. The search method according to claim 14, wherein:
the first address is a current state of a search;
a code corresponding to the first node is a code corresponding to a character of the object searched; and
an address of the second memory region that stores information including the first tag and the second address is generated by hashing the first address and a code corresponding to the first node.

16. The search method according to claim 15, wherein:
the second memory region has a plurality of memory regions; and
addresses used to access the plurality of memory regions are generated by different hashing methods corresponding to the respective memory regions.

17. The search method according to claim 16, wherein information including the first tag and the second address is stored in the plurality of memory regions of the second memory region by comparing the numbers of empty entries of the respective memory regions and storing information in order from the memory region with the largest number of empty entries so that the numbers of empty entries of the plurality of memory regions are approximately the same.

18. The search method according to claim 14, further comprising:
storing information including the first tag and the second address that is not stored in the second memory region in a third memory region; and
selecting first information read from the first memory region, second information read from the second memory region and third information read from the third memory region based on a comparison of a second tag including the first address input and the code with the first tag read from the second and third memory regions.

* * * * *